United States Patent [19]

Kawata

[11] Patent Number: 4,801,881
[45] Date of Patent: Jan. 31, 1989

[54] MAGNETORESISTIVE SENSOR HAVING PROTECTIVE DUMMY ELEMENTS

[75] Inventor: Sadao Kawata, Koide, Japan

[73] Assignee: Alps Electric Co., Ltd., Japan

[21] Appl. No.: 42,379

[22] Filed: Apr. 24, 1987

[30] Foreign Application Priority Data

Sep. 2, 1986 [JP] Japan .............................. 61-134706[U]

[51] Int. Cl.$^4$ ................................................ G01B 7/30
[52] U.S. Cl. ................................. 324/208; 338/32 R; 324/252; 324/262
[58] Field of Search ............... 324/207, 208, 252, 262; 338/32 R; 365/158, 97

[56] References Cited

U.S. PATENT DOCUMENTS 4,079,360  3/1978  Ookubo et al. ................... 365/158
4,403,187  9/1983  Takahashi et al. ................ 324/208

Primary Examiner—Reinhard J. Eisenzopf
Assistant Examiner—Warren S. Edmonds
Attorney, Agent, or Firm—Guy W. Shoup; Paul J. Winters; Leighton K. Chong

[57] ABSTRACT

A rotation information detector comprising plural magnetoresistant elements arranged parallel and adjacent to a rotating magnetic field and dummy elements located parallel on both sides of the magnetoresistant elements wherein rotation information is detected on the basis of those electric resistances on the magnetoresistant elements which change responsive to the change of the magnetic field, characterized in that boundary patterns are formed between the magnetoresistant elements and the dummy ones, respectively, so that the magnetoresistant elements can be distinctly distinguished from the dummy ones to enhance the efficiency of appearance check.

3 Claims, 2 Drawing Sheets

4,801,881

MAGNETORESISTIVE SENSOR HAVING PROTECTIVE DUMMY ELEMENTS

BACKGROUND OF THE INVENTION (a) Field of the Invention

The present invention relates to a rotation information detector and more particularly, it relates to a rotation information detector for detecting rotation information such as the rotating speed and position of rotating bodies, using magnetoresistant elements.

(b) Prior Art

The magnetic encoder which is high sensitive, excellent in frequency characteristics, and simple in construction and which uses magnetoresistant elements to detect the rotating position and speed of a rotating body such as the drum and disc driven by the motor or the like has attracted attention as a rotation information detector.

The rotation information detector which uses the elements comprises forming slim elements on a substrate such the glass plate, arranging eight of them side by side and bridge-connecting every four of them. When the rotation information detector thus made is arranged adjacent to the rotating surface of the drum, for example, on which magnetic signals have been recorded, the magnetoresistant elements of the rotation information detector change their electric resistance responsive to change in magnetic field exerted by the rotating body and rotation information signals based on this change of their electric resistance can be picked up from the bridge circuit.

The magnetoresistant elements comprises forming a thin ferromagnetic film layer of permalloy, for example, on the substrate and then applying photoetching or the like to it to form plural slim pieces arranged side by side. In this case, however, etching solution gathers thick on both sides of the plural parallel-arranged magnetoresistant elements and those magnetoresistant elements which are located on these both sides are made more slim by the thick-gathered etching solution, as compared with the ones located nearer to the center.

SUMMARY OF THE INVENTION

The present invention is therefore intended to eliminate the above-mentioned drawback.

Accordingly, the object of the present invention is to provide a rotation information detector which enables magnetoresistant elements to be reliably distinguished from dummy ones to enhance the efficiency of appearance check.

The object of the present invention can be achieved by a rotation information detector comprising plural parallel-arranged magnetoresistant elements located adjacent to a rotating magnetic field, and dummy elements located parallel on both sides of the grouped magnetoresistant elements, wherein rotation information is detected basing on those electric resistances of the magnetoresistant elements which change responsive to the change of the magnetic field, characterized in that a boundary pattern is interposed between the magnetoresistant elements and the dummy ones.

DETAILED DESCRIPTION OF THE PREFERRED EMBODIMENT

Figure 1:
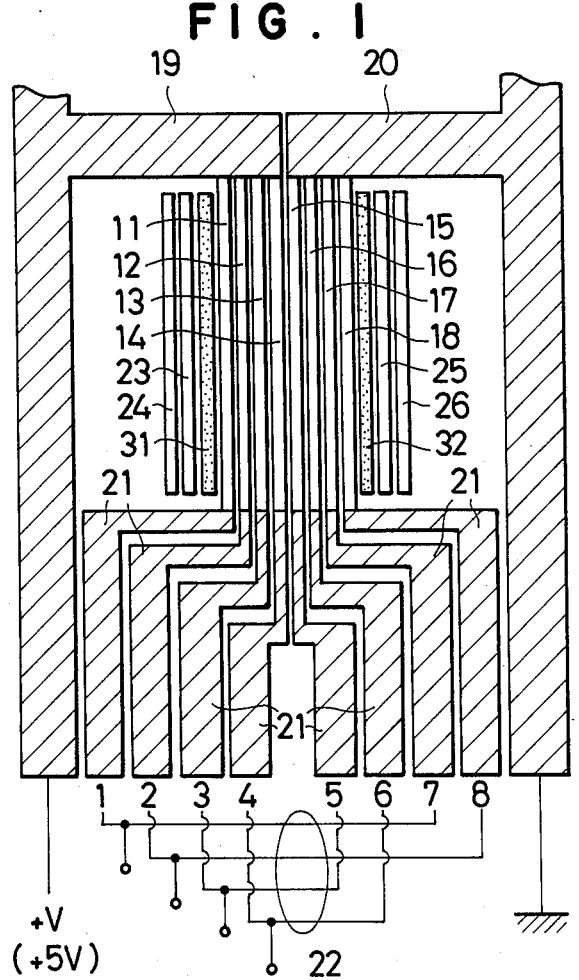
FIG. 1 is a plan view showing an example of the rotation information detector according to the present invention.
Figure 2:
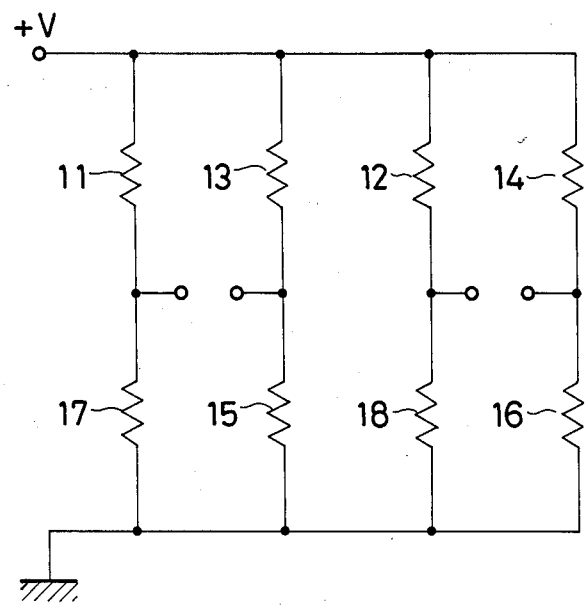
FIG. 2 is a circuit diagram showing a bridge circuit for magnetoresistant elements.

A rotation information detector shown in FIG. 1 has eight slim parallel-arranged magnetoresistant elements 11–18, which are formed on a substrate such as the glass plate by etching or the like. The first to fourth magnetoresistant elements 11–14 are connected, at the both ends thereof, to conductive members 19 and 21 made of aluminum, copper or the like and then to a power source of 5 V through the conductive member 19. The fifth to eighth magnetoresistant elements 15–18 are similarly connected to conductive members 20 and 21 at the both ends thereof and then grounded through the conductive member 20. The conductive members 21 are connected each other through a lead line 22, so that one end of the first magnetoresistant element 11 is connected to one end of the seventh magnetoresistant element 17, one end of the second magnetoresistant element 12 to one end of the eighth magnetoresistant element 18, one end of the third magnetoresistant element 13 to one end of the fifth magnetoresistant element 15 and one end of the fourth magnetoresistant element 14 to one end of the sixth magnetoresistant element 16, thereby forming two pairs of bridge circuits between the earth and the power source of 5 V, as shown in FIG. 2.

Boundary patterns 31 and 32 made of copper, for example, are located parallel on both sides of the eight magnetoresistant elements 11–18 and dummy elements 23, 24 and 25, 26 are located parallel outside the boundary patterns 31 and 32, respectively.

The dummy elements 23, 24 and 25, 26 serve to prevent the magnetoresistant elements from being influenced by etching solution in wide spaces on both sides of the magnetoresistant elements, while the boundary patterns 31 and 32 serve to distinctly distinguish the magnetoresistant elements from the dummy ones, as described above. More specifically, the boundary pattern 31 distinctly distinguishes the magnetoresistant elements 11–14 from the dummy ones 23, 24, while the boundary pattern 32 distinctly distinguishes the magnetoresistant elements 18–15 from the dummy ones 25, 26.

The boundary patterns 31 and 32 are made of copper, as described above, and they are different in color from the magnetoresistant elements made of permalloy and the dummy elements, so that they can be distinctly distinguished from the both. When the magnetoresistant elements are appearance-checked, therefore, it can be reliably confirmed whether or not the now-checking element is dummy, depending upon which side of the boundary pattern 31 or 32 the now-checking element is located on, thereby enabling the appearance check to be carried out more efficiently for a shorter time period.

The boundary patterns 31 and 32 are formed simultaneously along with the conductive members 19, 20 and 21 made of copper or the like. Therefore, the manufacturing process is left unchanged and same as the conventional one even if the boundary patterns 31 and 32 are added.

According to the present invention as described above, the boundary patterns are interposed between the magnetoresistant elements and the dummy ones, respectively. The magnetoresistant elements can be thus distinctly distinguished from the dummy ones, thereby enabling the appearance check to take a shorter time to enhance its efficiency.

I claim:

1. A rotation information detector including plural magnetoresistant elements located parallel and adjacent to a rotating magnetic field wherein rotation information is detected on the basis of those electric resistances of the magnetoresistant elements which change responsive to the change of the magnetic field, characterized in that dummy elements are located parallel on both sides of the plural parallel-arranged magnetoresistant elements to protect said magnetoresistant elements during fabrication.

2. A rotation information detector according to claim 1 wherein the magnetoresistant elements are eight in number and connected to two pairs of bridges and wherein the dummy elements located on both sides of the magnetoresistant elements are one or more.

3. A rotation information detector according to claim 1 wherein boundary patterns are formed between the magnetoresistant elements and the dummy ones, respectively, to allow visual discrimination therebetween.

* * * * *